Patented Feb. 11, 1941

2,231,836

UNITED STATES PATENT OFFICE 2,231,836

PROCESS OF PRODUCING SOUND RECORDS

Werner Zerweck and Karl Keller, Frankfort-on-the-Main-Fechenheim, and Peter Pinten, Cologne-Deutz, Germany, assignors to I. G. Farbenindustrie Aktiengesellschaft, Frankfort-on-the-Main, Germany No Drawing. Application January 11, 1938, Serial No. 184,498. In Germany January 18, 1937

1 Claim. (Cl. 91—70)

Our invention relates to a method of making sound records.

For a long time great endeavours have been made towards removing the well known tendering of sound records. It is true that cellulosic derivatives and various polyvinyl condensation products yield tenacious records which are resistant to fracture, but such records have met with little approval on account of their softness. The hard phenolic resins and the hitherto known carbamide resins are hardened too slowly when pressed and therefore adhere to the mould.

Our present invention comprises the application for the manufacture of sound records of new resins obtained by condensing compounds containing pentavalent or hexavalent heterocyclic rings in which the group

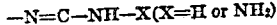
—N=C—NH—X(X=H or NH₂)

is present at least twice, with low molecular aliphatic aldehydes, particularly formaldehyde or agents setting free formaldehyde. The application of such resins allows of the manufacture of unobjectionable records. The new resins have moreover the advantage of yielding light coloured discs which are fast to light. As suitable resins there may be mentioned those obtained by condensing formaldehyde with melamine, ammeline, benzoguanamine, 2.4.6-tri- aminopyrimidine, 2-mercapto - 4.6 - pyrimidine, 2.3- and 2.4-diaminoquinazoline, 1.4-diaminophthalazine, cyanuric trihydrazide, guanazole, phenyl guanazole, and the like.

Papers which have been impregnated or coated with such resins can be worked up with an extraordinary rapidity to solid records, when pressed in the hot in the usual mould.

In order to obtain any desired thickness of the plate a plurality of impregnated papers may be arranged in layers. As basic material other substances, such as pasteboard, wood, sheet-metal and the like may be used and the resin may be laid thereon in a pure form, without any supporter. If no particular rigidity is necessary but if only the good capacity of the said resins for being pressed comes into consideration, powdered supporters may be added to the resins such as cotton, wood-dust, slate-dust, lamp black and the like.

We claim:

A process of producing sound records which comprises coating paper with a resin consisting of the condensation product of melamine with formaldehyde and hot pressing the resulting coated paper.

WERNER ZERWECK.
KARL KELLER.
PETER PINTEN.